(12) United States Patent
Pisano et al.

(10) Patent No.: US 10,470,961 B2
(45) Date of Patent: Nov. 12, 2019

(54) MULTIFUNCTIONAL APPARATUS FOR PASSIVE PHYSICAL REHABILITATION

(71) Applicant: M.C. FUTURA INNOVAZIONI SRL, Latina (IT)

(72) Inventors: Claudia Pisano, Latina (IT); Rocco Pisano, Latina (IT); Marcin Tadeusz Sobala Carvana, Latina (IT)

(73) Assignee: M.C. FUTURA INNOVAZIONI SRL, Latina (IT)

( * ) Notice: Subject to any disclaimer, the term of this patent is extended or adjusted under 35 U.S.C. 154(b) by 130 days.

(21) Appl. No.: 15/501,536

(22) PCT Filed: Aug. 5, 2015

(86) PCT No.: PCT/IB2015/055947
§ 371 (c)(1),
(2) Date: Feb. 3, 2017

(87) PCT Pub. No.: WO2016/020860
PCT Pub. Date: Feb. 11, 2016

(65) Prior Publication Data
US 2017/0224571 A1 Aug. 10, 2017

(30) Foreign Application Priority Data
Aug. 5, 2014 (IT) .............................. RM2014A0457

(51) Int. Cl.
*A61H 1/00* (2006.01)
*A61H 1/02* (2006.01)
(Continued)

(52) U.S. Cl.
CPC ............. *A61H 1/001* (2013.01); *A61H 1/005* (2013.01); *A61H 1/0274* (2013.01);
(Continued)

(58) Field of Classification Search
CPC .... A61H 1/001; A61H 1/0274; A61H 1/0255; A61H 1/005; A61H 2201/1635; A61H 2201/164; A61H 2201/1676; A61H 2203/0425; A61H 2201/0192; A61H 2201/1633; A61H 2203/0431; A61H 2201/1621; A61H 2201/1638; A61H 2201/1642; A61H 2201/149; A61H 2201/1253; A61H 2201/163; A61H 2201/1481; A61H 2203/0406; B62K 3/16; B62M 1/12; A61G 5/14
See application file for complete search history.

(56) References Cited

U.S. PATENT DOCUMENTS 452,541 A    5/1891 Connor et al.
2,629,371 A  2/1953 Kocian et al.
(Continued)

FOREIGN PATENT DOCUMENTS

CN    2336826 Y    9/1999
CN    102499846 A  6/2012
(Continued)

*Primary Examiner* — Andrew S Lo
(74) *Attorney, Agent, or Firm* — Browdy and Neimark, P.L.L.C.

(57) ABSTRACT

There is provided a multifunctional apparatus for the passive physical rehabilitation comprising a main frame (1), and a second frame (2) which incorporates a seat (3) and a backrest (20) for supporting a user (10), the apparatus is characterized in that is movable onto a surface while performing the physical rehabilitation exercise, and in that it further comprises first supporting means (41) for supporting the lower limbs ends of the user (10) associated to a transmission shaft (40), said first supporting means being mounted in oscillating manner onto said main frame (1); and second supporting means (43,44) for supporting the upper limbs ends of the user (10) associated to said transmission shaft (40), said supporting means (44) being mounted in oscillating manner relative to said main frame (1); the arrangement being such that as a result of the motion of the apparatus the same causes a reciprocating elliptical motion of said first supporting means (41) and said second supporting means (44) for supporting the limbs ends of the user (10) with a predetermined amplitude.

18 Claims, 5 Drawing Sheets

(51) Int. Cl.
*B62K 3/16* (2006.01)
*A61G 5/14* (2006.01)
*B62M 1/12* (2006.01)

(52) U.S. Cl.
CPC ............ *A61H 2201/1253* (2013.01); *A61H 2201/149* (2013.01); *A61H 2201/1481* (2013.01); *A61H 2201/164* (2013.01); *A61H 2201/1633* (2013.01); *A61H 2201/1635* (2013.01); *A61H 2201/1676* (2013.01); *A61H 2203/0406* (2013.01); *A61H 2203/0425* (2013.01); *A61H 2203/0431* (2013.01)

(56) References Cited

U.S. PATENT DOCUMENTS

| | | |
|---|---|---|
| 4,249,774 A | 2/1981 | Andreasson |
| 5,836,855 A | 11/1998 | Eschenbach |
| 6,247,714 B1 | 6/2001 | Rasmussen et al. |
| 7,996,080 B1 | 8/2011 | Hartman et al. |
| 2002/0052268 A1* | 5/2002 | Morcillo-Quintero ................ A63B 23/0211 482/92 |
| 2005/0245358 A1* | 11/2005 | Mercado .......... A63B 21/00181 482/52 |
| 2011/0095505 A1* | 4/2011 | Heath .................. B62M 1/12 280/210 |
| 2013/0092465 A1* | 4/2013 | Moldestad .......... B62K 15/008 180/206.4 |
| 2014/0274574 A1* | 9/2014 | Shorten .............. A63B 22/0046 482/52 |
| 2015/0165265 A1* | 6/2015 | Tholkes ............. A63B 22/0664 482/54 |

FOREIGN PATENT DOCUMENTS

| | | |
|---|---|---|
| CN | 103860359 A | 6/2014 |
| DE | 10310659 A1 | 9/2004 |
| WO | 9215271 A1 | 9/1992 |
| WO | 2011046789 A1 | 4/2011 |

* cited by examiner

MULTIFUNCTIONAL APPARATUS FOR PASSIVE PHYSICAL REHABILITATION

DISCLOSURE

The present invention relates to a multifunctional apparatus for the passive physical rehabilitation and, more specifically, to a multifunctional apparatus for the passive physical rehabilitation of persons with disabilities and/or difficulty movement of their limbs.

STATE OF THE ART

To date, different embodiments and types of apparatuses of such a kind are already known, and with the aim of providing help to people having chronic disease or disability, or who have difficulty in walking. Further, there have been proposed such types of apparatuses with the aim to reduce the costs associated to the presence of two or three therapists and doctors and/or trainers to guide the movements of the patient during workouts.

A number of innovative therapies have been developed to help people in rehabilitating to walk or move, and to improve their overall health. This technique resulted in improvements for patients who when possible are in a standing up position, and in such a way that the results obtained exceed those from conventional therapy.

Furthermore, it is known that people having disabilities and/or chronic diseases are at greater risk of developing additional health problems, in part because of the inability to practice exercises at a sufficiently efficient level.

There is therefore the need of apparatuses suitable for the involvement of moderate levels of exercise for the patient, for prevent or delay the onset of other chronic diseases. In addition, exercise reduces or prevents further functional reductions associated with the disuse and inactivity.

Recently, there have been proposed on the market apparatuses or mechanized apparatus for the rehabilitation of gait, which guide the feet of a patient to simulate the movements of the walk.

For example, it is known from WO2011046789 an apparatus for the rehabilitation and exercise that allows a person with physical limitations or disabilities or chronic diseases, the use of the apparatus in order to rehabilitate his muscles, and improve joint flexibility and improve cardiovascular fitness.

The apparatus comprises a frame, a first and a second crank arm, a first and second handlebar, a first and a second pedal, a motor and pulley, a first and a second coupler, and a unit for controlling the speed of an electric motor.

Furthermore, from U.S. Pat. No. 7,996,080 B1 it is known an apparatus for the rehabilitation in patients with motion problems, and in which they are facilitated the performance of an exercise using an electrical stimulation. The apparatus includes a seat area for receiving a person and the relevant housings for the feet, in order to move the latter in a reciprocating motion back and forth with respect to a stationary base, and along a path between a first position wherein the legs are at least partially curved, and a second position wherein the legs are bent less than the first position. Furthermore, there is provided an electrical stimulator to facilitate the execution of the exercise by the moving subject along the route. Additionally, a device for adaptive control can be used to improve the exercise.

Additionally, CN102499846 describes an apparatus for the exercise of the upper and lower limbs of patients suffering from motor difficulties, such as patients suffering from quadriplegic spasm, Parkinson's disease, muscular weakness of the limbs, and other symptoms. The apparatus comprises a frame, a seat, a hydraulic lift, a pair of pedals associated to a disc, handles, a display, and a frame of stretching. Since the width of the seat can be adjusted, a patient may normally be in the seat or lie down on it to perform different types of exercise. In addition, the seat can be removed to install a wheelchair. By means of this apparatus the upper and lower limbs can be trained and the cost for the treatment of patients can be reduced.

The aim, therefore, of the present invention is to provide an improved multifunctional apparatus for the passive rehabilitation in patients having disabilities and difficulty in moving the limbs, and which is highly effective for the patient, highly reliable and simple to make.

Another object of the present invention is to provide an improved multifunctional apparatus for the passive rehabilitation in persons having disabilities and difficulty movement of the limbs, which apparatus foresees the presence of only one therapist and/or doctor to help and guide the movements of the patient during the motion exercises.

BRIEF DESCRIPTION OF THE INVENTION

According to the present invention there is provided multifunctional apparatus for the passive physical rehabilitation in persons with disabilities, the apparatus being adapted to move on a surface, and comprises a main frame having an elongated shape and onto which there is mounted a second frame which carries a seat for supporting a user, the seat being movable between a first position and a second position which is located upwards than the first position, a first pair of rotating wheels associated to a first end of said main frame, said pair of wheels being mutually connected via a transmission shaft, and a second pair of rotating wheels associated to a second end of the main frame, the second pair of wheels being mounted in a rotatable manner onto a sleeve integral with the main frame and being connected to an handlebar, said first pair of wheels being adapted to transmit the motion of the apparatus to the transmission shaft and converting the motion into a rotary motion of the transmission shaft, said transmission shaft being associated to a pair of swinging platforms to support the lower limbs ends of the user, the platforms being oscillating by means of hinge connection and such that the rotary motion of the shaft is transformed into a reciprocating elliptical motion of the platforms, and wherein is further provided a transmission of the rotary motion of the shaft to a rotatable disc mounted onto said main frame, said rotatable disc being associated with a pair of elongated handlebar which provide respective support for the user's hands, the rotation of the rotating disk is transformed in a reciprocating elliptical motion of the handlebars and therefore of the upper limbs of the user.

The present invention provides a multifunctional apparatus for the passive physical rehabilitation of persons having disabilities substantially according to the appended claims.

DETAILED DESCRIPTION OF THE INVENTION

A detailed description of a preferred embodiment of the multifunctional apparatus for the passive physical rehabilitation of the present invention will now be given, by way of a non limiting example and with reference to the appended drawings, wherein.

Figure 1:
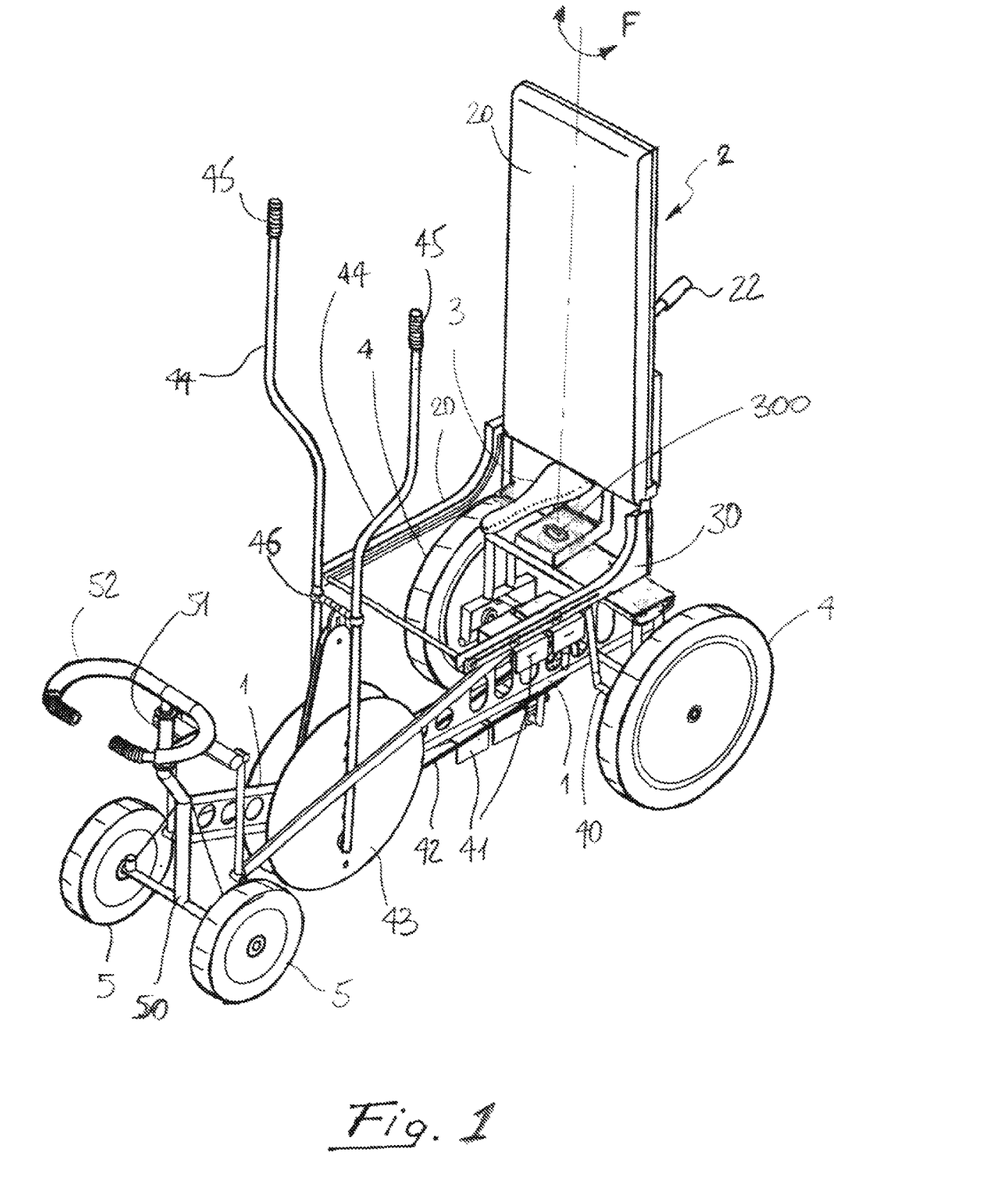
FIG. 1 is a perspective view from one side and from above which illustrates the apparatus of the present invention in a non-operating condition.

With reference now to FIG. 1, therein is illustrated the apparatus of the present invention in a non-operating condition.

The apparatus comprises a main frame 1 of elongated shape and which is substantially constituted by a beam frame. On the frame 1 there is connected a second frame 2 which incorporates a seat 3 and a backrest 20 for supporting a user.

The so configured whole frame 2 and together with the seat 3 it is connected in rotatable and lockable manner onto the main frame 1 by means of a plate associated with a connection pin 300.

The arrangement of the frame 2 onto the frame 1 is such that it can be rotated by 90 degrees around its vertical axis and with respect to frame 1 and as indicated by the arrow F (for example, counterclockwise with respect to FIG. 1).

Figure 2:
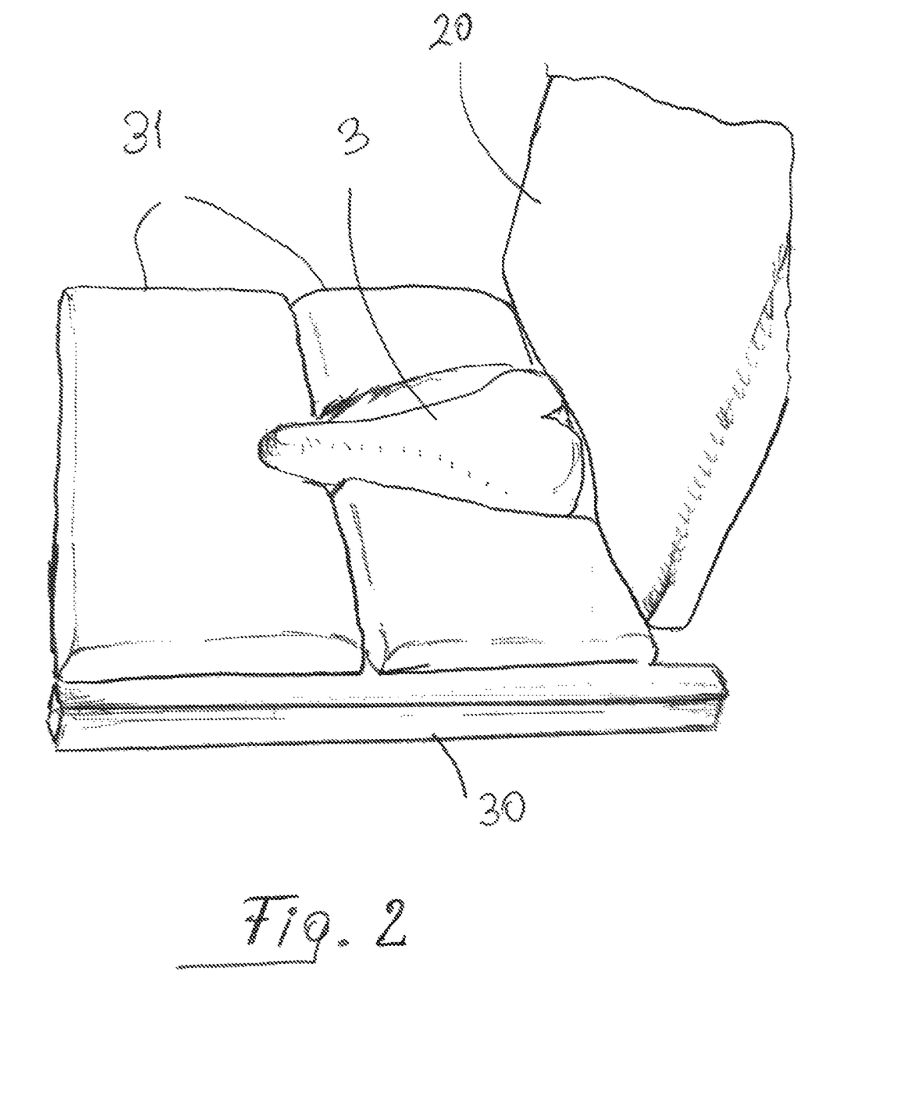
FIG. 2 is a partial detailed view of a part relating to the seat apparatus of the present invention.

With particular reference now to FIG. 2, there is partially and detailed illustrated therein the seat of the frame 2. More precisely, the seat of the present apparatus is constituted by a seat 3 having a saddle anatomically shaped and a further seating area consisting of a pair of folding panels 31 which are mounted in a sliding hinged and oscillating on a pair of brackets 30.

As it is apparent from FIGS. 1 and 2, following the rotation of the frame 2 of an angular amplitude of 90 degrees about its vertical axis (see arrow F), the entire seat (backrest 20, saddle 3 and panels 31) is arranged externally to the overall dimensions of the apparatus. In this condition, the seat initially provides a facilitated support for a user who present reduced mobility and during its transfer from its usual support to the apparatus 1 itself.

Once the user is positioned onto the seat and stabilized therein, subsequently the whole frame 2 can be again rotated by 90 degrees in the opposite direction (clockwise according to FIG. 1 and arrow F), to place the user within the apparatus, and according to the operating modes of the latter.

In addition and as it will be better understood hereinafter the seat 3 is detachable from the panels 31 to perform an excursion along the backrest 20 and for supporting the user even in the upright position vertically.

With reference now to FIG. 1, there are provided a pair of handlebars 44 mounted in a movable hinged manner on a disc 43, the latter being rotatable mounted onto the frame 1. Their operation will be better understood and illustrated hereinafter.

Figure 3:
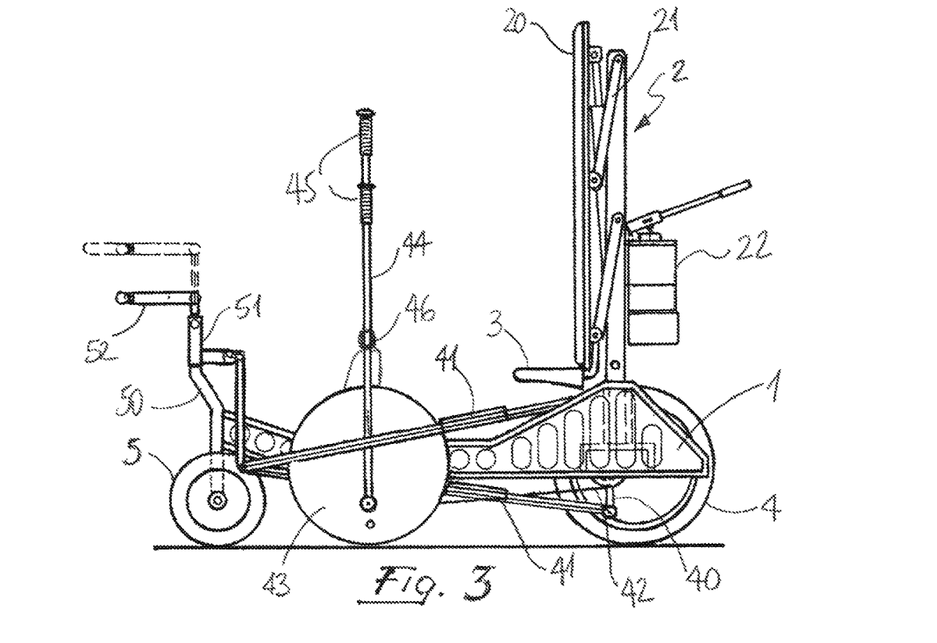
FIG. 3 is a side elevational view of the apparatus of the present invention in a non-operating condition.

With particular reference now to FIG. 3, the backrest 20 and the relevant seat 3 are mounted in a telescopic manner with respect to the main frame 1, therefore allowing the former to make excursions relative to the latter. The excursion of the backrest 20 and associated seat 3 with respect to a second frame 2 is obtained by a lever system 21 operated by a manual (or, alternatively, electric powered) hydraulic actuator 22 or equivalent.

On the other hand and as can be appreciated from the figures, the apparatus 1 is adapted to move onto a surface. For the purpose there is provided a first pair of wheels 4 rotatable associated to a first end of the main frame 1. The pair of wheels 4 being mutually connected via a transmission shaft 40.

At the opposite end of the main frame 1 there is provided a second pair of rotatable wheels 5, the second pair of wheels 5 being mutually connected via a tubular frame 50, the frame 50 is rotatable connected in a sleeve integral with the main frame 1. The tubular frame 50 being further connected to a telescopic handlebar 52.

As will be better understood hereinafter, and with particular reference to FIGS. 3 and 6, the adjustment of the excursion of the handlebar 52 allows the intervention of a specialist person who assists the user and in cooperation with the latter.

On the other hand, the rotation of the first pair of wheels 4 transmits the motion to the transmission shaft 40 and transforms it into a rotary motion of the latter. The transmission shaft 40 is a crankshaft, and it is linked to a pair of platforms 41, the platforms 41 being mounted in oscillating reciprocating manner by means of a hinge connection (i.e., such as crank-rod connection) to the transmission shaft 40 and onto the main frame 1, and such that the rotary motion of the transmission shaft 40 be transformed into a reciprocating elliptical motion of the platforms 41.

Moreover, it is further provided a second transmission of the rotary motion of the shaft 40 to the disc 43 rotatably mounted onto said main frame 1, the transmission being constituted by a toothed wheel mounted onto the shaft 40 and a chain 42 (the latter partially illustrated in the figures).

The rotatable disk 43 is associated to the pair of elongated handlebars 44 which are mounted on the disk 43 in a hinged manner, and further they are slidably mounted within respective guides 46 which are connected with the frame 1. The guides 46 are mounted in a hinged manner onto a telescopic support integral with the frame 1, the telescopic support being arranged in order to allow telescopic excursions of the same with respect to the frame 1. Alternatively, it can be provided also the possibility of making an adjustment of the excursion of the length of the handlebars 44, the latter being telescopically arranged.

It should be noted that the rotation of the rotatable disk 43 transforms into a reciprocating elliptical motion of the ends 45 of the handlebars 44, and the telescopic excursions of the hinges 46 have the purpose of being capable to change and adjust the amplitude of oscillation of the handlebars 44 according to kinematic connecting rod-crank and in the manner per se already known in the art.

Figure 4:
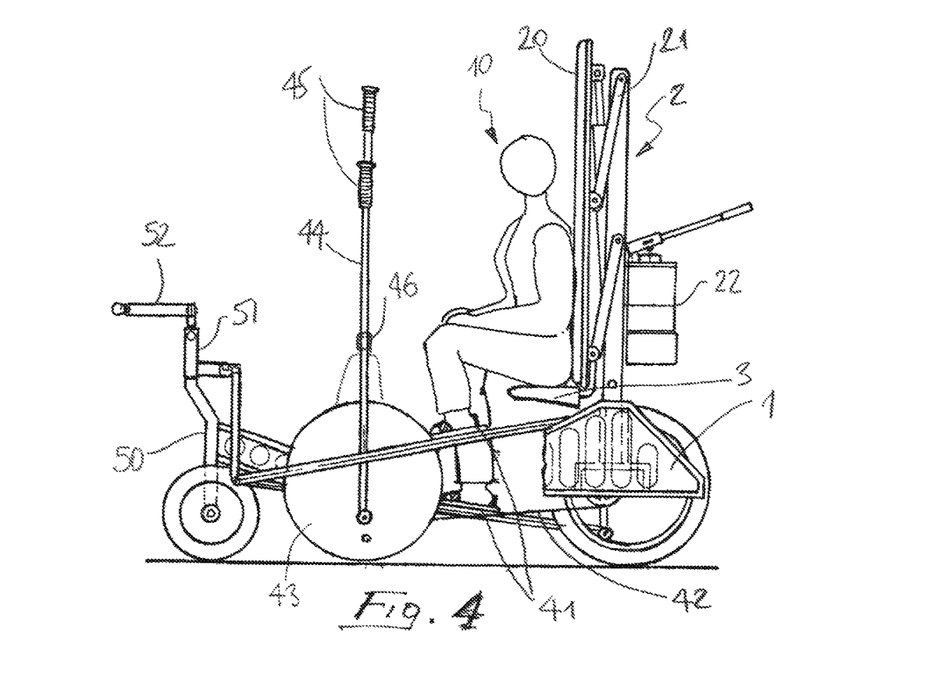
FIG. 4 is a side elevational view of the apparatus of the present invention in a first operating condition.

With reference now to FIG. 4, there is illustrated therein the apparatus in an operating condition.

As illustrated, a user 10 is positioned onto the seat (the latter not being shown in the figure for clarity reasons) and simultaneously on the seat 3 and, resting on the backrest 20.

In order to support the user onto the apparatus 10 in a firm and reliable condition, he may be secured to the backrest 20 with simple belts or waistbands at his chest and waist parts (not shown in the figures). The same applies to the feet of the user who, after having placed his feet on the platforms 41, they are secured in position by means of belts or the like. If the user is not able to hold his head, it may be provided projections for the lateral containment of the head onto the backrest 20 (the latter not shown). After this stabilization step of the user 10, the next step consist of positioning the same within the apparatus.

Figure 5:
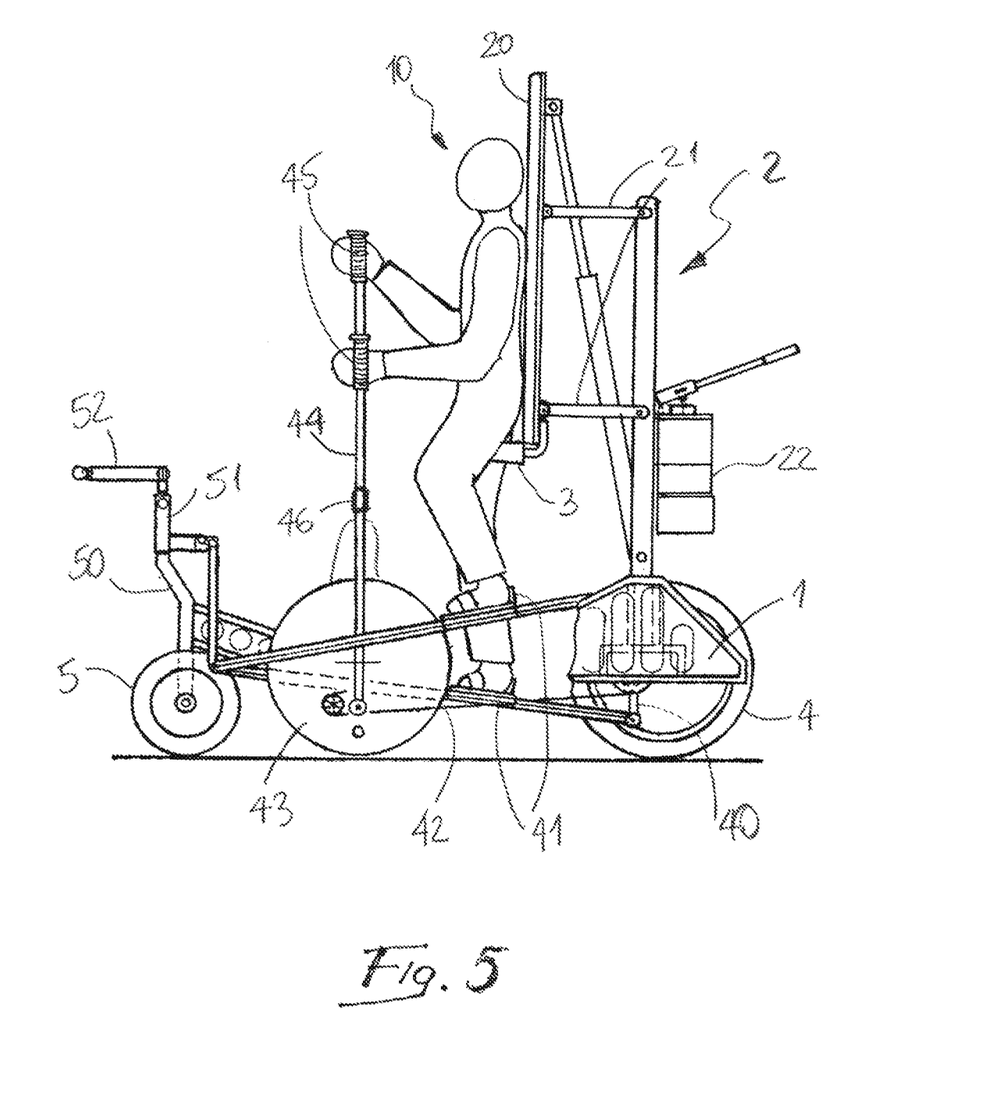
FIG. 5 is a side elevational view of the apparatus of the present invention in a second operating condition.

With particular reference now to FIG. 5, there is illustrated therein the apparatus in a second operating condition.

More precisely, once verified the correct stabilization of the user, it is provided that the backrest 20 and the related seat 3 gradually be raised relative to the frame 1 by means of the hydraulic actuator 22 to bring the user in a substantially upright standing condition with respect to the apparatus. In this condition, the panels 31 of the seat remain within the brackets 30 and may be withdrawn or be closed by sliding the former in a booklet arrangement on the brackets 30 (not shown in the figure).

Once reached the vertical position of the user, it is provided that he holds the ends of the elongated handlebar 44, where a handle 45 is provided therein. Also in this case and if necessary, the ends of the upper limbs (e.g., hands) will be secured to the handles 45 by straps or bands or the like, and in such a way that they cannot accidentally disengage during the entire duration of therapeutic exercise.

Figure 6:
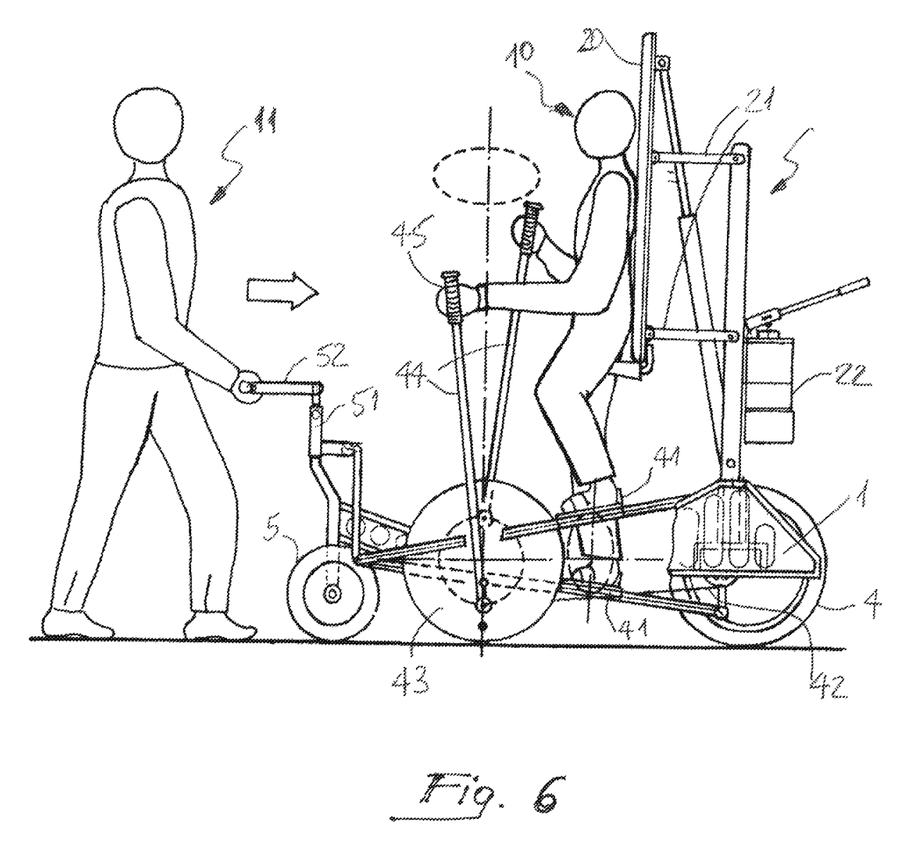
FIG. 6 is a side elevational view of the apparatus of the present invention in a third operating condition.

With reference now to FIG. 6, it is illustrated therein the operation of the apparatus during an passive physical rehabilitation exercise.

More precisely, according to the present invention it is provided that the apparatus is actuated and moved solely by the thrust generated by an assistant who in this case will be a therapist 11 or analogous. According to the present embodiment, the thrust is exerted by the driver (i.e., the assistant 11) which rests his hands onto the telescopic handlebars 52 and pushes advancing. In alternative embodiment, it may also be provided a motor drive to assist the assistant 11 during functioning.

The thrust causes the apparatus to move according to the kinematic transmission mechanisms above described in detail, and which results in the displacement of the four wheels 4 and 5, and which transform in a reciprocating elliptical motion of the platforms 41 as well as the handlebars 44, therefore synchronically moving in a elliptical motion the lower limbs and the upper limbs of the user 10.

Here, it must be pointed out that the motion of the apparatus causes on the user a perfectly coordinated simulated walk.

According to one aspect of the apparatus of the present invention, the transmission of the motion of the apparatus is specifically reduced to the user, i.e. each step of the driver 11 corresponds to half step of the user (transmitted via transmission and its kinematic mechanisms), therefore the step amplitude of the user 10 will be exactly half that of the driver 11.

The driver 11 is a very important key figure, as on him it depends not only the good operation of the apparatus, but also the good result of the therapy. In fact, the driver 11 being head-on with the patient can advantageously observe the reactions of the patient 10 himself while pushing the apparatus, and then change the pace of the walk depending on the effect desired, and above all he may observe the physical conditions of the patient.

The invention claimed is:

1. A multifunctional apparatus for passive physical rehabilitation of a user, comprising:
    a main frame; and
    a second frame which incorporates a seat and a backrest for supporting the user, and
    characterized in that it further comprises:
    first supporting means for supporting the lower limbs ends of the user, said means being associated with a transmission rotatable shaft, said first supporting means being mounted in oscillating manner relative to said main frame; and
    second supporting means for supporting the upper limbs ends of the user, said means being associated with said transmission rotatable shaft, said second supporting means being mounted in oscillating manner relative to said main frame;
    the arrangement being such that upon rotation of said transmission shaft it is generated a reciprocating oscillating elliptical motion of said first supporting means and said second supporting means for supporting said limbs ends of the user, the motion having a predetermined amplitude and frequency;
    wherein said apparatus is configured to be actuated and moved by means of a human thrust generated by an assisting driver, the thrust being applied to a handlebar, the moving of said apparatus causes the reciprocated elliptical motion of said first supporting means and to the related lower limbs of the user, and to said second supporting means and to the related upper limbs of said user thereby simulating a walking step motion for the user, the arrangement being such that the transmission of the motion be substantially reduced in a manner that to a number and amplitude of steps of the driver it corresponds a smaller number and amplitude of steps for the user with respect to the former.

2. The multifunctional apparatus for the passive physical rehabilitation according to claim 1, wherein said backrest and said seat are mounted in a movable and telescopic manner with respect to said main frame and capable of performing a vertical upwards displacement with respect to said main frame by means of a lever system moved by an actuator.

3. The multifunctional apparatus for the passive physical rehabilitation according to claim 1, wherein said backrest and said seat are mounted in rotatable manner relative to said main frame and capable of rotating by an angular excursion of 90 degrees with respect to said main frame.

4. The multifunctional apparatus for the passive physical rehabilitation according to claim 1, wherein said apparatus is adapted to move onto a surface during operation, and it further comprises:
    a first pair of rotatable wheels associated with a first end of said main frame, at least one wheel of said first pair of rotatable wheels being connected to said transmission rotatable shaft, and
    a second pair of rotatable wheels associated to a second end of said main frame, said second pair of rotatable wheels being mounted in rotatable manner onto said main frame and being connected to the handlebar.

5. The multifunctional apparatus for the passive physical rehabilitation according to claim 4, wherein said first pair of rotatable wheels transmits rotary motion to said transmission rotatable shaft, said transmission rotatable shaft being a crankshaft.

6. The multifunctional apparatus for the passive physical rehabilitation according to claim 5, wherein said supporting means of the lower limbs ends of the user comprises a pair of footrests associated to said crankshaft, said footrests being mounted in an oscillating manner by means of a hinge connection with said crankshaft and on said main frame respectively, and such that the rotary motion of the crankshaft is transformed into a reciprocating elliptical motion of the footrests.

7. The multifunctional apparatus for the passive physical rehabilitation according to claim 5, wherein said supporting means of the upper limbs ends of the user comprises:
    a disc rotatably mounted onto said main frame;
    a pair of elongated handlebars which are mounted onto said disc in a hinged manner, and said pair of elongated handlebars being slidable into respective guides integral with said main frame; and a second transmission of the rotary motion of the crankshaft to said disc, the second transmission comprising a gear integral with the crankshaft and a chain;

the arrangement being such that rotation of the disc moves with a reciprocating elliptical motion the ends of the pair of elongated handlebars.

8. The multifunctional apparatus for the passive physical rehabilitation according to claim 4, wherein said second pair of rotatable wheels are mutually connected by a tubular frame, said tubular frame being connected in rotary manner to the main frame by a sleeve integral to the main frame, the tubular frame being associated to the handlebar, the handlebar being a telescopic handlebar.

9. The multifunctional apparatus for the passive physical rehabilitation according to claim 2, wherein said seat comprises a first seat connected with said backrest, and a pair of panels hinged and slidable mounted onto a pair of brackets integral with said second frame.

10. The multifunctional apparatus for the passive physical rehabilitation according to claim 2, wherein the vertical upwards displacement of said backrest and said seat with respect to the main frame of the apparatus causes the user to move from a sitting position to a substantially upright standing position.

11. A multifunctional apparatus for the passive physical rehabilitation of a user, comprising:
a main frame; and
a second frame connected to the first main frame, and comprising a seat and a backrest for supporting the user,
a transmission rotatable shaft; and
a first support to support lower limbs ends of the user, said first support being associated with said transmission rotatable shaft, and said first support being mounted in oscillating manner relative to said main frame; and
a second support to support upper limbs ends of the user, said second support being associated with said transmission rotatable shaft, and said second support being mounted in oscillating manner relative to said main frame;
wherein said first and second support is configured such that upon rotation of said transmission rotatable shaft, a reciprocating oscillating elliptical motion of said first support and said second support is generated to support said lower and upper limbs ends of the user, the motion having a predetermined amplitude and frequency;
wherein said apparatus is configured to be actuated and moved by a human thrust generated by an assisting driver, the thrust being applied to a handlebar, the moving of said apparatus causes the reciprocated elliptical motion of said first support and to the related lower limbs of the user, and to said second support and to the related upper limbs of said user thereby simulating a walking step motion for the user, the arrangement being such that the transmission of the motion be substantially reduced in a manner that to a number and amplitude of steps of the driver it corresponds a smaller number and amplitude of steps for the user with respect to the former.

12. The multifunctional apparatus for the passive physical rehabilitation according to claim 11, further comprising a lever system connected to said backrest and said seat, an actuator connected to move said lever system, wherein said backrest and said seat are mounted in a movable and telescopic manner with respect to said main frame and are configured to perform a vertical upwards excursion with respect to said main frame upon actuation by said actuator via said lever system, and wherein said backrest and said seat are mounted in rotatable manner relative to said main frame and configured to rotate by an angular excursion of 90 degrees with respect to said main frame.

13. The multifunctional apparatus for the passive physical rehabilitation according to claim 12, wherein said seat comprises a first seat connected with said backrest, and a pair of panels hinged and slidable mounted onto a pair of brackets integral with said second frame.

14. The multifunctional apparatus for the passive physical rehabilitation according to claim 12, wherein the vertical upwards displacement of said backrest and said seat with respect to the main frame of the apparatus causes the user to move from a sitting position to a substantially upright standing position.

15. The multifunctional apparatus for the passive physical rehabilitation according to claim 11, wherein said apparatus is configured to move onto a surface during operation, and further comprises:
a first pair of rotatable wheels associated with a first end of said main frame, at least one wheel of said first pair of rotatable wheels being connected to said transmission rotatable shaft to transmit rotary motion to said transmission rotatable shaft; and
a second pair of rotatable wheels associated with a second end of said main frame, said second pair of rotatable wheels being mounted in a rotatable manner onto said main frame and being connected to the handlebar.

16. The multifunctional apparatus for the passive physical rehabilitation according to claim 15, wherein said second pair of rotatable wheels are mutually connected by a tubular frame, said tubular frame being rotationally connected to the main frame by a sleeve integral to the main frame, the tubular frame being associated with the handlebar, the handlebar being a telescopic handlebar.

17. The multifunctional apparatus for the passive physical rehabilitation according to claim 11, wherein the transmission rotatable shaft is a crankshaft, and said first support of the lower limbs ends of the user comprises a pair of footrests associated with said crankshaft, said footrests being mounted in an oscillating manner by a hinge connection with said crankshaft and on said main frame respectively, and such that the rotary motion of the crankshaft is transformed into a reciprocating elliptical motion of the pair of footrests.

18. The multifunctional apparatus for the passive physical rehabilitation according to claim 11, wherein the transmission rotatable shaft is a crankshaft, and said second support of the upper limbs ends of the user comprises:
a disc rotatably mounted onto said main frame;
a pair of elongated handlebars which are mounted onto said disc in a hinged manner, said pair of elongated handlebars being slidable into respective guides integral with said main frame; and
a second transmission to transfer the rotary motion of the crankshaft to said disc, the second transmission comprising a gear integral with the crankshaft and a chain;
wherein rotation of the disc moves the ends of the pair of elongated handlebars in a reciprocating elliptical motion.

* * * * *